June 30, 1931. P. KÄPPLER 1,811,940
PARALLELOGRAM TYPE PANTOGRAPH
Filed Aug. 30, 1929

Inventor:
Paul Käppler
By ......... Attorney

Patented June 30, 1931

1,811,940

UNITED STATES PATENT OFFICE

PAUL KÄPPLER, OF DRESDEN, GERMANY

PARALLELOGRAM-TYPE PANTOGRAPH

Application filed August 30, 1929, Serial No. 389,366, and in Germany April 10, 1929.

The present invention relates to pantographs for machines, apparatus and instruments employing pantographs or like enlarging and reducing apparatus, or copying apparatus and has for its object to provide a greater ratio between the movements of the tracing point and the stylus, work tool or microscope and also to attain greater accuracy in the reduction or enlargement, particularly in apparatus for viewing the work tool of machines such as lathes, grinding machines, planers, gear wheel milling machines and the like.

In the ordinary construction of pantographs with a relatively large reduction or enlargement, the fixed pole or pivot, one of the link pivots and the stylus, tool spindle or microscope are so close together that a firm support cannot be obtained. Therefore in engraving machines the expedient is adopted of arranging the pivots in different planes, e. g. the fixed pole or pivot is arranged above and the engraving tool or tool spindle is arranged below the pantograph system. It is obvious that the accuracy of the apparatus is thus endangered owing to the difficulty of manufacture and manipulation as well as owing to the side forces which occur. Thus the reduction or enlargement which can be attained is very limited.

All these drawbacks are overcome according to the present invention by constructing the axes of the fixed pole, link pivot and stylus, tool spindle or microscope (which ordinarily are close together) in the form of nested bushes with eccentric bores in such a manner that the pivot pin of the pivoted link of the parallelogram encloses or embraces the adjacent link joint of the parallelogram and the said link joint encloses or embraces the stylus or reducing pen, reproducing tool, viewing microscope or the like.

One manner of carrying out the invention is illustrated in the accompanying drawing by way of example.

The link system 1, 2, 3 and 4 is rotatably mounted on a fixed pole or pivot in a supporting block 5. The tracing point or pin 6 which e. g. traces the pattern Z is carried at the end of a rod 9 whilst a microscope is indicated at 7 e. g. for viewing the work tool of a machine. In place of the microscope there may be a reproducing stylus or the spindle of a reproducing tool.

Figure 1:
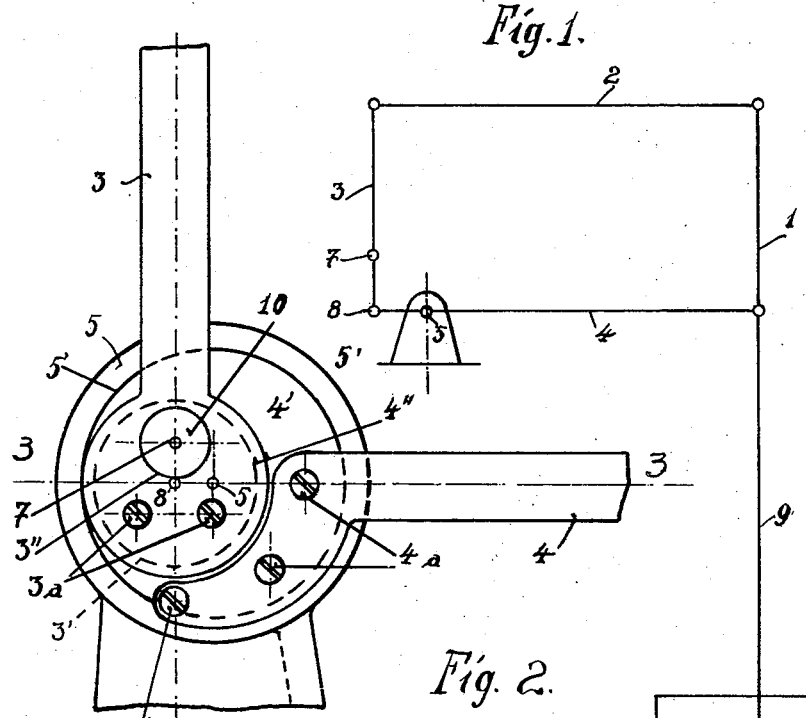
Figure 1 is a diagrammatic plan view of a pantograph.
Figure 2:
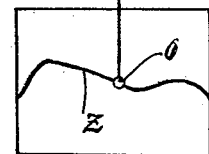
Fig. 2 is an elevation showing a practical construction of the fixed pole or pivot with its eccentric bushes and Fig. 3 is a cross-sectional view through the parts shown in Fig. 2 on line 3—3.
Figure 3:
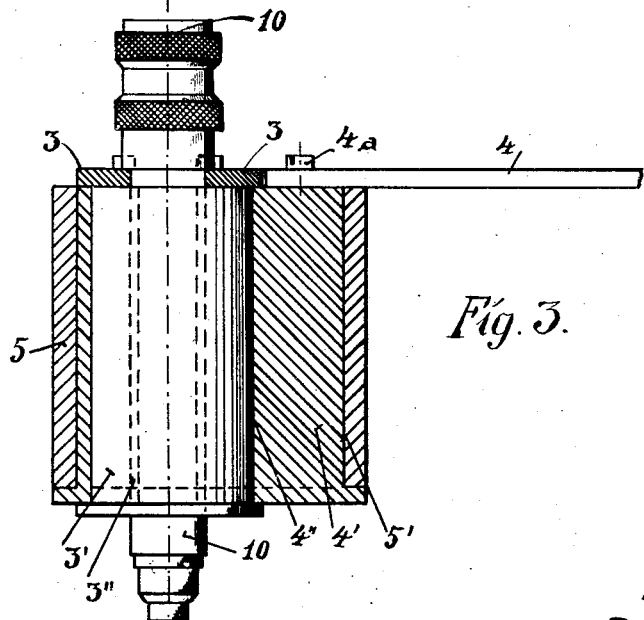

According to the present invention and as shown in Fig. 2, the block 5 which serves as the fixed pole or pivot has a large internal bore 5' in which a bush 4' is rotatably mounted, the bush 4' being fixed by screws 4a or the like to the link 4. The bush 4' has an eccentric bore 4'' whose axis coincides with the point 8 in Fig. 1. In the eccentric bore 4'' is rotatably mounted a bush 3' fixed by screws 3a or the like to the link 3. The bush 3' has an eccentric bore 3'' whose axis coincides with the point 7 and in the bore 3'' is mounted a tool, stylus or other reproducing instrument, here illustrated as a microscope 10 for viewing a machine tool. It will be observed that in this manner a firm mounting and support for the work tool or microscope 10 is ensured. The distance from the centre of the bore 5' to the centre of the eccentric bore 4'' represents the distance between the points 5 and 8 in Fig. 1 and the distance from the centre of the bush 3' to the centre of the eccentric bore 3'' represents the distance between the points 8 and 7 in Fig. 1. The eccentricity of the bushes 3' and 4' can be accurately measured and made to within a few thousandths of a millimetre. The greater the reduction or enlargement to be made by the pantograph, the smaller will the eccentricity of the bushes be made, so that the greatest reduction or enlargement can be obtained without difficulty.

The bearing faces of the bushes may also be fitted with or constructed as ball or roller bearings.

Variation of the reduction or enlargement can be obtained in the construction according to the present invention by correspondingly varying the lengths of the links 2 and 4 and of the arm 9 (by substituting longer or shorter links) or by replacing the bushes 3' and 4' by bushes of different eccentricity. It is also conceivable that the eccentricity of the bushes might be variable and adjustable by means of wedges or the like.

The invention can also be employed with machines, apparatus or instruments in which the reproducing tool, stylus or the like is guided by a plurality of pantographs. The bushes may also be each adjustable in the direction of their centres.

Claims:

1. In a pantograph of the parallelogram type, a fixed pivot for one of the links of the parallelogram comprising a member attached to said link and rotatably embracing the adjacent link joint of the parallelogram, said link joint having its axis of rotation eccentric to, but within, said member and comprising a member which rotatably embraces a reproducing element, eccentric to its axis of rotation.

2. A pantograph comprising a link-jointed parallelogram, one link joint of which comprises inner and outer relatively rotatable bushes in eccentric relation to each other, each bush being attached to one link of the parallelogram, a reproducing element eccentrically mounted within the inner bush, and a bearing within which the outer bush is rotatably mounted.

3. A pantograph comprising a system of links jointed to form a parallelogram, one of said links carrying a tracing point, and one of the link joints comprising inner and outer cylindrical members attached to adjacent links, the inner member being rotatable within an eccentric aperture in the outer member, a reproducing instrument eccentrically mounted within the inner member, and a stationary bearing encircling the outer member.

4. A pantograph comprising a link-jointed parallelogram, a link joint of which comprises inner and outer relatively rotatable bushings, each attached to one link of the parallelogram, a reproducing element mounted within the inner bushing, and a bearing supporting the outer bushing for rotary movement.

5. A pantograph comprising a system of links jointed to form a parallelogram, one of the link joints comprising inner and outer cylindrical members attached to adjacent links, the inner member being rotatable within the outer member, a work tool carried by one of the links, a second work tool mounted within the inner member, and a stationary bearing encircling the outer member.

In testimony whereof I have affixed my signature.

PAUL KÄPPLER.